United States Patent
Tsai et al.

(10) Patent No.: US 10,992,357 B1
(45) Date of Patent: Apr. 27, 2021

(54) MULTI-RESOLUTION BEAM PATTERN DESIGN METHOD OF ANTENNA ARRAY SYSTEM

(71) Applicant: National Tsing Hua University, Hsinchu (TW)

(72) Inventors: Yuh-Ren Tsai, Hsinchu (TW); Wen-Tsai Lin, Hsinchu (TW); Chin-Liang Wang, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 17/084,572

(22) Filed: Oct. 29, 2020

(30) Foreign Application Priority Data

Sep. 21, 2020 (TW) ................................ 109132503

(51) Int. Cl.
*H04B 7/06* (2006.01)
(52) U.S. Cl.
CPC .................................. *H04B 7/0617* (2013.01)
(58) Field of Classification Search
CPC ...................................................... H04B 7/0617
USPC ......................................................... 375/267
See application file for complete search history.

(56) References Cited

U.S. PATENT DOCUMENTS

| 2015/0365142 | A1 | 12/2015 | Chai et al. | |
| 2015/0381247 | A1* | 12/2015 | Ko | H04B 7/0632 370/329 |
| 2018/0183505 | A1* | 6/2018 | Kim | H04B 7/0634 |

FOREIGN PATENT DOCUMENTS

| CN | 101124734 | 2/2008 |
| CN | 101808342 | 8/2010 |
| CN | 104168047 | 11/2014 |
| CN | 106452524 | 2/2017 |
| CN | 106454870 | 2/2017 |
| TW | I620423 | 4/2018 |

OTHER PUBLICATIONS

Tong He et al., "Suboptimal beam search algorithm and codebook design for millimeter-wave communications", Mobile Netw Appl, Jan. 25, 2015, pp. 1-13.

(Continued)

*Primary Examiner* — Fitwi Y Hailegiorgis
(74) *Attorney, Agent, or Firm* — JCIPRNET (57) ABSTRACT

A beam pattern design method is adapted to an antenna array system. An antenna array of the antenna array system includes a plurality of antenna devices. The beam pattern design method includes the following procedures. A plurality of first virtual beamforming vectors having a first resolution are set. Each of the plurality of first virtual beamforming vectors corresponds to all the antenna devices in the antenna array. Corresponding weights are respectively assigned to phases of the plurality of first virtual beamforming vectors to generate a plurality of correspondingly weighted first virtual beamforming vectors. The plurality of correspondingly weighted first virtual beamforming vectors are linearly combined to synthesize a provisional vector having a second resolution. The phase of each element in the provisional vector is extracted, and a fixed amplitude is provided to the extracted phase of each element in the provisional vector to generate a final beamforming vector.

13 Claims, 4 Drawing Sheets

(56) References Cited

OTHER PUBLICATIONS

Zhenyu Xiao et al., "Hierarchical codebook design for beamforming training in millimeter-wave communication", IEEE Trans. Wireless Commun, May 2016, pp. 3380-3392.

Deli Qiao et al., "Multi-resolution codebook design for two-stage precoding in FDD massive MIMO networks", 2017 IEEE 18th International Workshop on Signal Processing Advances in Wireless Communications (SPAWC), Jul. 2017, pp. 1-5.

* cited by examiner

MULTI-RESOLUTION BEAM PATTERN DESIGN METHOD OF ANTENNA ARRAY SYSTEM

CROSS-REFERENCE TO RELATED APPLICATION

This application claims the priority benefit of Taiwan application serial no. 109132503, filed on Sep. 21, 2020. The entirety of the above-mentioned patent application is hereby incorporated by reference herein and made a part of this specification.

BACKGROUND OF THE INVENTION

1. Field of the Invention

The invention relates to a beam pattern design method, and particularly relates to a beam pattern design method of an antenna array system.

2. Description of Related Art

To cope with the severe propagation loss in the millimeter wave (mm-wave) frequency bands, directional beamforming is applied both at the transmitting end and the receiving end to facilitate the transmission efficiency. The transmission coverage in an angular-domain of a signal depends on the beam width of the beam pattern that is adopted. Therefore, different beam patterns with different beam widths may be required for different purposes or under different situations. As a result, a set of beam patterns with multiple resolutions in the angular-domain is required for a wireless communication system using beamforming transmission via an antenna array.

Generally, the highest resolution beam width (which corresponds to the narrowest beam width) among all possible beam patterns generated by an antenna array relies on the number of all the antenna devices in the antenna array. If the number of antenna devices in a dimension (vertical or horizontal direction) is N, then the highest angular-domain resolution in the dimension is N. In other words, the angular-domain in the dimension may be partitioned into as many as N orthogonal main beams. However, the angular-domain may also be partitioned into a number of orthogonal main beams less than N. In other words, the angular-domain is partitioned by using orthogonal main beams with a lower resolution. Conventionally, the orthogonal main beams may be constructed based on the discrete Fourier transform (DFT) basis vectors. For example, if a beam pattern with the highest angular-domain resolution is required, all the N antenna devices are used and the corresponding beamforming vector has a vector dimension N. By contrast, if a beam pattern with a lower angular-domain resolution N/2 is required, only N/2 antenna devices are required, and the beamforming vector constructed based on the DFT basis vector has a vector dimension of N/2.

In the design of beam patterns, it is favorable that the antenna gain variation within the designed coverage be as small as possible and the power leakage outside the coverage also be as small as possible. However, the power leakage of the beam pattern corresponding to a beamforming vector based on the DFT basis vector outside the coverage is significant. Therefore, for beamforming transmission applications, further efforts is required to design a set of multi-resolution beam patterns with a favorable property.

SUMMARY OF THE INVENTION

The invention provides a multi-resolution beam pattern design method with which a set of multi-resolution beam patterns with a favorable property can be designed.

An embodiment of the invention provides a beam pattern design method. The beam pattern design method is adapted to an antenna array system. An antenna array of the antenna array system includes a plurality of antenna devices. The beam pattern design method includes the following procedures. A plurality of first virtual beamforming vectors having a first resolution are set. Each of the first virtual beamforming vectors corresponds to all the antenna devices in the antenna array. Corresponding weights are assigned to phases of the first virtual beamforming vectors, so as to generate a plurality of correspondingly weighted first virtual beamforming vectors. The correspondingly weighted first virtual beamforming vectors are combined linearly to synthesize a provisional vector having a second resolution. The phase of each element in the provisional vector is extracted, and a fixed amplitude is provided to the extracted phase of each element in the provisional vector to generate a final beamforming vector.

Another embodiment of the invention provides a beam pattern design method. The beam pattern design method is adapted to an antenna array system. An antenna array of the antenna array system includes a plurality of antenna devices. The beam pattern design method includes the following procedures. A plurality of antenna devices are partitioned into a plurality of antenna sub-arrays not overlapped with each other. Each of the antenna sub-arrays comprises at least one antenna device. A plurality of first virtual beamforming vectors having a first resolution are respectively set for each antenna sub-array. Each first beamforming vector respectively corresponds to all antenna devices in the corresponding antenna sub-array. Corresponding weights are respectively assigned to phases of the first virtual beamforming vectors of each antenna sub-array, so as to respectively generate a plurality of correspondingly weighted first virtual beamforming vectors of each of the antenna sub-arrays. The correspondingly weighted first virtual beamforming vectors of each of the antenna sub-arrays are respectively linearly combined to respectively synthesize a plurality of provisional vectors having a second resolution. A phase of each element in the provisional vectors is respectively extracted. A corresponding fixed amplitude is provided to the phase of each element in the extracted provisional vectors to respectively generate a plurality of sub-beamforming vectors corresponding to each antenna sub-array. The sub-beamforming vectors are assembled to generate a final beamforming vector.

Based on the above, in the embodiments of the invention, in order to sufficiently use all the hardware resources in the antenna array and more sufficiently facilitate the performance of the multi-resolution beam patterns, the embodiments of the invention provide the beam pattern design method which designs beam patterns of different resolutions by using all the antenna devices.

To make the above features and advantages of the invention more comprehensible, embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the embodiments of the invention, examples of which are illustrated in the accompanying drawings. Wherever possible, the same reference numbers are used in the drawings and the description to refer to the same or like parts.

Figure 1:
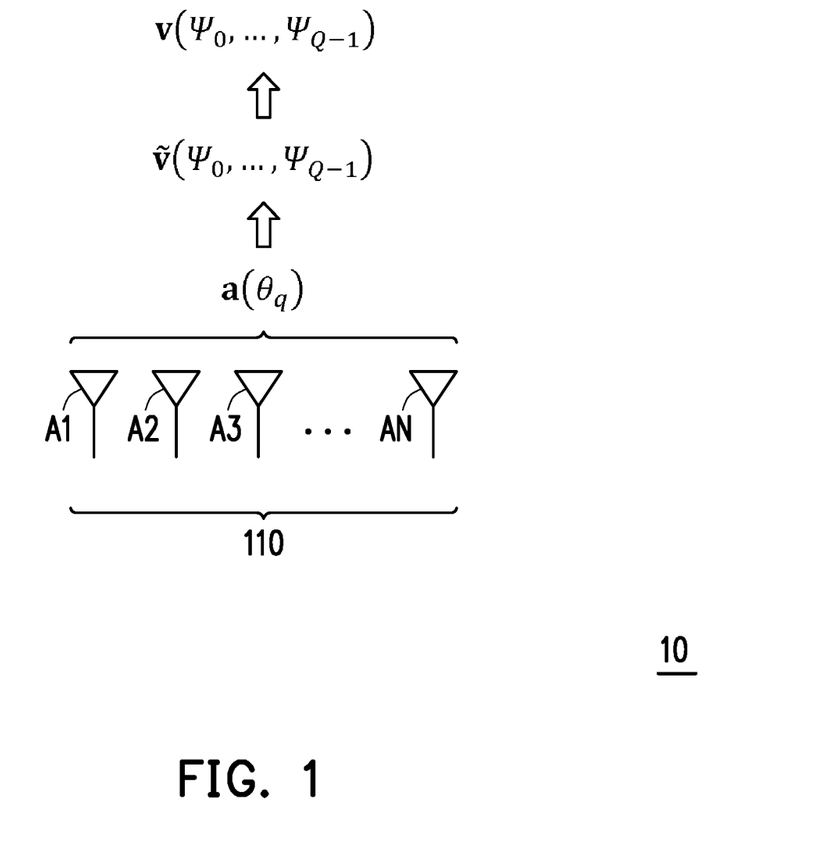
FIG. 1 is a schematic diagram illustrating a beam-synthesizing framework of beam synthesizing with phase extraction (BSPE) according to an embodiment of the invention.

FIG. 1 is a schematic diagram illustrating a beam-synthesizing framework of beam-synthesizing with phase extraction (BSPE) according to an embodiment of the invention. Referring to FIG. 1, an antenna array system 10 includes an antenna array 110. The antenna array 110 includes a plurality of antenna devices A1 to AN. In an embodiment, the antenna array system 10 is, for example, a fifth-generation (5G) communication system, such as an orthogonal frequency-division multiplexing communication system. The antenna system 10 may further include a user apparatus, a base station, a processor, and a transceiver. However, the invention is not limited thereto.

In the following, it is assumed that the N antenna devices A1 to AN of the antenna array 110 are evenly arranged to form a uniform linear array (ULA), and may be extended to the scenario of a uniform planar array (UPA). A beamforming vector v (or codeword) is defined as a unit vector with a length of N. Accordingly, the beamforming vector v may be represented as Formula (1) below:

$$v = \frac{1}{\sqrt{N}}[v_0, v_1, v_2, \ldots, v_{(N-1)}]^T \qquad (1)$$

Formula (1) may correspond to a beam pattern for signal transmission in the antenna array system 10.

An orthogonal beam pattern is constructed based on a discrete Fourier transform (DFT) basis vector. For example, in the antenna array 110, a virtual beamforming vector $a(\theta)$ of a DFT-based orthogonal beam may be represented as Formula (2):

$$a(\theta) = \frac{1}{\sqrt{N}}\left[1, e^{\frac{j2\pi d\theta}{\lambda}}, e^{-\frac{j4\pi d\theta}{\lambda}}, \ldots, e^{-\frac{j2\pi(N-1)d\theta}{\lambda}}\right] \qquad (2)$$

$$= \frac{1}{\sqrt{N}}[1, e^{-j\pi\theta}, e^{-j2\pi\theta}, \ldots, e^{-j(N-1)\pi\theta}],$$

wherein in $j=\sqrt{-1}$, $\lambda$ is the carrier wavelength, $d=\lambda/2$ is an inter-antenna device spacing assuming that a half-wavelength spacing is used, $\theta$ is the main beam direction, and the main beam direction $\theta$ is referred to as a spatial frequency $\theta \in (-1, +1)$ which may be mapped to a physical angle $\theta \in (-\pi/2, +\pi/2)$ covered by a one-sided spatial domain in a one-to-one relation $\theta = \sin(\phi)$.

When the beamforming vector v having the highest angular-domain resolution is used, all the antenna devices A1 to AN in the antenna array 110 need to be activated, as shown in FIG. 1. Alternatively, if a beam pattern having a lower angular-domain resolution is required, the beam pattern may be generated by using a DFT-based virtual beamforming vector $a(\theta)$ with a reduced vector dimension. At this time, only some of the antenna devices are activated. Details in this regard will be further elaborated in subsequent paragraphs.

According to the beam-synthesizing framework of BSPE shown in FIG. 1, a plurality of first virtual beamforming vectors $a(\theta_q)$ having a first resolution are set by using DFT-based basis vectors. The first virtual beamforming vectors $a(\theta_q)$ include first virtual beamforming vectors $a(\theta_0)$, $a(\theta_1)$, ..., $a(\theta_{Q-1})$, and $0 \le q \le Q-1$. In the embodiment, Q is the number of virtual beamforming vectors having the highest resolution. In the embodiment, the first resolution is defined as the highest resolution. In addition, since the highest resolution is used, each of the first virtual beamforming vectors $a(\theta_q)$ respectively corresponds to all the antenna devices A1 to AN in the antenna array. In other words, each of the first virtual beamforming vectors $a(\theta_q)$ has N elements respectively corresponding to all the antenna devices A1 to AN. Therefore, the first virtual beamforming vectors $a(\theta_q)$ are the virtual beamforming vectors having the highest resolution in the antenna array system 10.

Then, corresponding weights $e^{j\Psi_q}$ are respectively assigned to the phases of the first virtual beamforming vectors $a(\theta_q)$, so as to generate a plurality of correspondingly weighted first virtual beamforming vectors $e^{j\Psi_q} a(\theta_q)$, and $0 \le q \le Q-1$. The corresponding weights $e^{j\Psi_q}$ may be considered as phase rotations $\Psi_q$ applied to the first virtual beamforming vectors $a(\theta_q)$. Then, the correspondingly weighted first virtual beamforming vectors $e^{j\Psi_q} a(\theta_q)$ are linearly combined to synthesize a provisional vector $\tilde{v}(\Psi_0, \ldots, \Psi_{Q-1})$ having a second resolution, as represented by Formula (3):

$$\tilde{v}(\Psi_0, \ldots, \Psi_{Q-1}) = e^{j\Psi_0}a(\theta_0) + e^{j\Psi_1}a(\theta_1) + e^{j\Psi_2}a(\theta_2) + \ldots + e^{j\Psi_{Q-1}}a((\theta_{Q-1})) \qquad (3)$$

In the embodiment, the provisional vector $\tilde{v}(\Psi_0, \ldots, \Psi_{Q-1})$ having the second resolution is generated by assigning the corresponding weights $e^{j\Psi_q}$ to the first virtual beamforming vectors $a(\theta_q)$ having the first resolution and linearly combining the correspondingly weighted first virtual beamforming vectors, and the first resolution is the highest resolution, so the first resolution is greater than the second resolution.

After the provisional vector $\tilde{v}(\Psi_0, \ldots, \Psi_{Q-1})$ is synthesized, the phase of each element $\tilde{v}_i$ in the provisional vector $\tilde{v}(\Psi_0, \ldots, \Psi_{Q-1})$ is extracted, a fixed amplitude is set to meet a fixed amplitude constraint of the beamforming vectors, and a final beamforming vector $v(\Psi_0, \ldots, \Psi_{Q-1})$ is thus generated. The final beamforming vector $v(\Psi_0, \ldots, \Psi_{Q-1})$ is represented in Formula (4):

$$v(\Psi_0, \ldots, \Psi_{Q-1}) = \frac{1}{\sqrt{N}}\tilde{v}(\Psi_0, \ldots, \Psi_{Q-1}) \oslash |\tilde{v}(\Psi_0, \ldots, \Psi_{Q-1})| \qquad (4)$$

The operation $\tilde{v}(\Psi_0, \ldots, \Psi_{Q-1}) \oslash |\tilde{v}(\Psi_0, \ldots, \Psi_{Q-1})|$ indicates each element in $\tilde{v}(\Psi_0, \ldots, \Psi_{Q-1})$ is normalized (i.e., element-wise normalization), so that each element in the final beamforming vector $v(\Psi_0, \ldots, \Psi_{Q-1})$ has the same amplitude, and each element $v_i$ in the final beamforming vector $v(\Psi_0, \ldots, \Psi_{Q-1})$ may be represented as follows:

$$v_i = \frac{1}{\sqrt{N}} \tilde{v}_i / |\tilde{v}_i| = \frac{1}{\sqrt{N}} e^{j\varphi_i}, \quad (5)$$

wherein $\varphi_i$ is the phase of the element $\tilde{v}_i$. $\Psi = \{\Psi_0, \ldots, \Psi_{Q-1}\}$ is defined as a set of all the corresponding weights used in the beamforming vector $v(\Psi_0, \ldots, \Psi_{Q-1})$.

Figure 2:
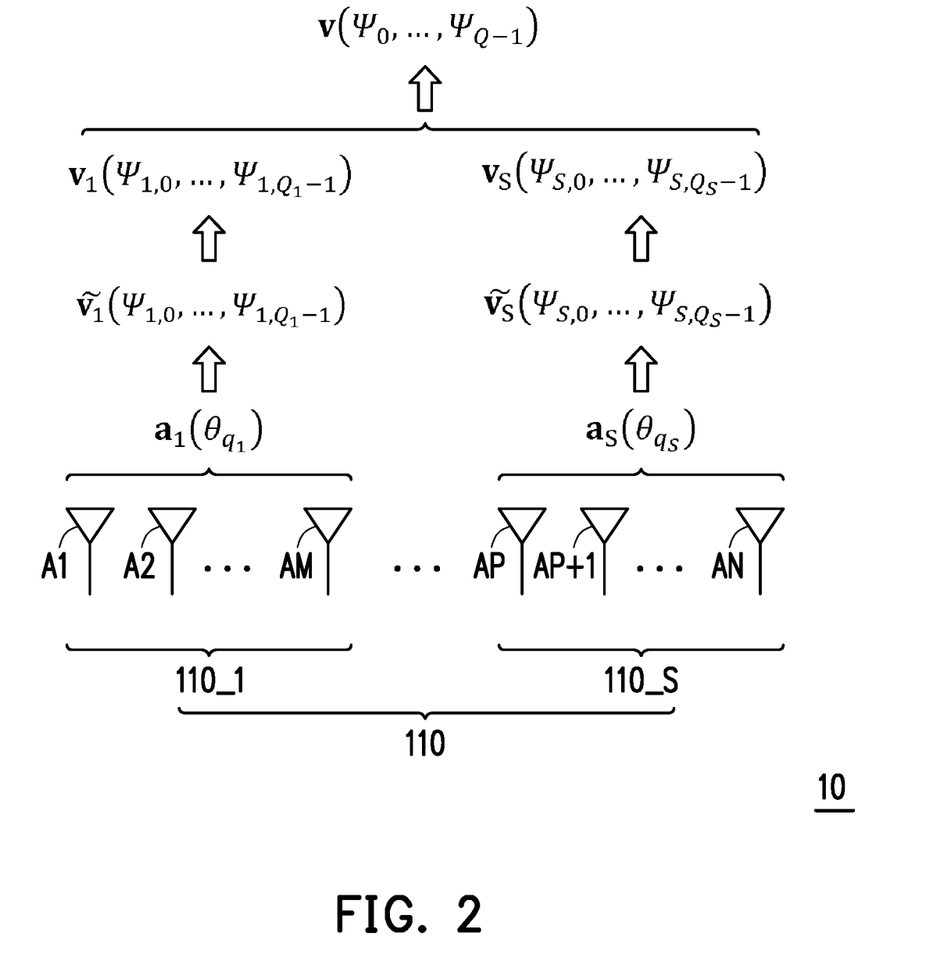
FIG. 2 is a schematic diagram illustrating a beam-synthesizing framework of BSPE-JOINT (joint sub-array and deactivation) according to another embodiment of the invention.

FIG. 2 is a schematic diagram illustrating a beam-synthesizing framework of BSPE-JOINT (joint sub-array and deactivation) according to another embodiment of the invention. Referring to FIG. 2, the antenna array system 10 includes the antenna array 110. The antenna array 110 includes the antenna devices A1 to AN. In an embodiment, the antenna array system 10 is, for example, a fifth-generation (5G) communication system, such as an orthogonal frequency-division multiplexing communication system. The antenna system 10 may further include a user apparatus, a base station, a processor, and a transceiver. However, the invention is not limited thereto.

In the embodiment, when the resolution required by the beam pattern is lower than the highest resolution, the beam pattern may be generated by using a DFT-based virtual beamforming vector $a(\theta)$ with a reduced vector dimension. At this time, only some of the antenna devices are activated.

According to the beam synthesizing framework of BSPE-JOINT as shown in FIG. 2, the antenna devices A1 to AN in the antenna array 110 are partitioned into antenna sub-arrays 110_1 to 110_S not overlapped with each other. S represents the number of antenna sub-arrays included in the antenna array 110. Each antenna sub-array of the antenna sub-arrays 110_1 to 110_S includes at least one antenna device. The antenna devices of different antenna sub-arrays do not overlap with each other. In the embodiment, the antenna sub-array 110_1 includes antenna devices A1, A2, ..., AM, and the antenna sub-array 110_S includes AP, AP+1, ..., AN. In addition, M<P. In addition, the numbers of antenna devices included in the respective antenna sub-arrays may be equal or not equal to one another. For example, assuming that the antenna array has 16 antenna devices, the antenna array may be partitioned into four antenna sub-arrays, and each antenna sub-array has four antenna devices not overlapped with each other. Alternatively, the antenna array may also be partitioned into three antenna sub-arrays respectively having 4, 4, and 8 antenna devices not overlapped with each other. The invention is not particularly limited by the number of antenna sub-arrays and the number of antenna devices included in each antenna sub-array.

Then, a plurality of first virtual beamforming vectors $a_1(\theta_{q_1})$ having the first resolution are set for the antenna sub-array 110_1 by using the DFT basis vectors. Following the same principle, a plurality of first beamforming vectors $a_S(\theta_{q_S})$ having the first resolution are set for the antenna sub-array 110_S. The first virtual beamforming vectors $a_1(\theta_{q_1})$ include the first virtual beamforming vectors $a_1(\theta_0)$, $a_1(\theta_1)$, ..., and $a_1(\theta_{Q_1-1})$, and $0 \leq q_1 \leq Q_1-1$. In addition, $a_1(\theta_0)$, $a_1(\theta_1)$, ..., and $a_1(\theta_{Q_1-1})$ respectively have a plurality of elements of all the antenna devices A1, A2, ..., AM in the antenna sub-array 110_1. In the embodiment, $Q_1$ is the number of virtual beamforming vectors having a higher resolution. The first virtual beamforming vectors $a_S(\theta_{q_S})$ include the first virtual beamforming vectors $a_S(\theta_0)$, $a_S(\theta_1)$, ..., $a_S(\theta_{Q_S-1})$, and $0 \leq q_S \leq Q_S-1$. In the embodiment, $Q_S$ is the number of virtual beamforming vectors having a higher resolution. In addition, $a_S(\theta_0)$, $a_S(\theta_1)$, ..., $a_S(\theta_{Q_S-1})$ in the first virtual beamforming vectors $a_S(\theta_{q_S})$ have a plurality of elements corresponding to all the antenna devices AP, AP+1, ..., AN in the antenna sub-array 110_S. Following the same principle, each antenna sub-array is set with a plurality of first virtual beamforming vectors having the first resolution. In the embodiment, the first resolution is defined as a higher resolution.

Then, corresponding weights $$e^{j\Psi_{1,q_1}}$$

are assigned to the phases of the first virtual beamforming vectors $a_1(\theta_{q_1})$ of the antenna sub-array 110_1, so as to generate a plurality of correspondingly weighted first virtual beamforming vectors $$e^{j\Psi_{1,q_1}} a_1(\theta_{q_1})$$

of the antenna sub-array 110_1, and $0 \leq q_1 \leq Q_1-1$. Following the same principle, corresponding weights $$e^{j\Psi_{S,q_S}}$$

are assigned to the phases of the first virtual beamforming vectors $a_S(\theta_{q_S})$ of the antenna sub-array 110_S, so as to generate a plurality of correspondingly weighted first virtual beamforming vectors $$e^{j\Psi_{S,q_S}} a_S(\theta_{q_S})$$

of the antenna sub-array 110_S. The corresponding weights $$e^{j\Psi_{1,q_1}}$$

may be considered as phase rotations $\Psi_{1,q_1}$ applied to the first virtual beamforming vectors $a_1(\theta_{q_1})$ in the antenna sub-array 110_1, and the corresponding weights $$e^{j\Psi_{S,q_S}}$$

may be considered as phase rotations $\Psi_{S,q_S}$ applied to the first virtual beamforming vectors $a_S(\theta_{q_S})$ in the antenna sub-array 110_S. Then, the correspondingly weighted first virtual beamforming vectors $$e^{j\Psi_{1,q_1}} a_1(\theta_{q_1})$$

of the antenna sub-array 110_1 are linearly combined, and, following the same principle, the correspondingly weighted first virtual beamforming vectors $$e^{j\Psi_{S,q_S}} a_S(\theta_{q_S})$$

of the antenna sub-array 110_S are linearly combined, so as to respectively synthesize provisional vectors $\tilde{v}_1(\Psi_{1,0}, \ldots, \Psi_{1,Q_1-1}), \ldots, \tilde{v}_S(\Psi_{S,0}, \ldots, \Psi_{S,Q_S-1})$ having the second resolution, wherein $\tilde{v}_S(\Psi_{S,0}, \ldots, \Psi_{S,Q_S-1})$ is as in Formula (6):

$$\tilde{v}_S(\Psi_{S,0}, \ldots, \Psi_{S,Q_S-1}) = \quad (6)$$
$$e^{j\Psi_{S,0}} a_S(\theta_0) + e^{j\Psi_{S,1}} a_S(\theta_1) + e^{j\Psi_{S,2}} a_S(\theta_2) + \ldots + e^{j\Psi_{S,(Q_S-1)}} a_S(\theta_{Q_S-1})$$

Following the same principle, synthesis is carried out for each antenna sub-array form a provisional vector having the second resolution. In the embodiment, the first resolution is a higher resolution, and the first resolution is higher than the second resolution.

After the provisional vectors $\tilde{v}_1(\Psi_{1,0}, \ldots, \Psi_{1,Q_1-1}), \ldots, \tilde{v}_S(\Psi_{S,0}, \ldots, \Psi_{S,Q_S-1})$ are synthesized, the phase of each element in the provisional vectors $\tilde{v}_1(\Psi_{1,0}, \ldots, \Psi_{1,Q_1-1}), \ldots, \tilde{v}_S(\Psi_{S,0}, \ldots, \Psi_{S,Q_S-1})$ is respectively extracted. The extraction of phases is the same as that described in FIG. 1, and therefore will not be repeated in the following. In addition, a fixed amplitude is provided to each element $\tilde{v}_{1,i}$ in the provisional vectors $\tilde{v}_1(\Psi_{1,0}, \ldots, \Psi_{1,Q_1-1}), \ldots, \tilde{v}_{S,i}$ in $\tilde{v}_S(\Psi_{S,0}, \ldots, \Psi_{S,Q_S-1})$, so as to respectively generate a plurality of sub-beamforming vectors $v_1(\Psi_{1,0}, \ldots, \Psi_{1,Q_1-1}), \ldots, v_S(\Psi_{S,0}, \ldots, \Psi_{S,Q_S-1})$ corresponding to the antenna sub-arrays 110_1 to 110_S. The sub-beamforming vectors $v_S(\Psi_{S,0}, \ldots, \Psi_{S,Q_S-1})$ are represented as Formula (7) in the following:

$$v_s(\Psi_{S,0}, \ldots, \Psi_{S,Q_S-1}) = \quad (7)$$
$$\frac{1}{\sqrt{N}} \tilde{v}_s(\Psi_{S,0}, \ldots, \Psi_{S,Q_S-1}) \oslash |\tilde{v}_s(\Psi_{S,0}, \ldots, \Psi_{S,Q_S-1})|,$$

wherein the operation $\tilde{v}_S(\Psi_{S,0}, \ldots, \Psi_{S,Q_S-1}) \oslash |\tilde{v}_S(\Psi_{S,0}, \ldots, \Psi_{S,Q_S-1})|$ indicates the element-wise normalization in $\tilde{v}_S(\Psi_{S,0}, \ldots, \Psi_{S,Q_S-1})$. The normalization is the same as that described in FIG. 1, and therefore will not be repeated in the following.

Then, after the sub-beamforming vectors $v_1(\Psi_{1,0}, \ldots, \Psi_{1,Q_1-1}), \ldots, v_S(\Psi_{S,0}, \ldots, \Psi_{S,Q_S-1})$ corresponding to the antenna sub-arrays 110_1 to 110_S are respectively generated, the sub-beamforming vectors $v_1(\Psi_{1,0}, \ldots, \Psi_{1,Q_1-1}), \ldots, v_S(\Psi_{S,0}, \ldots, \Psi_{S,q_S-1})$ are assembled to generate the final beamforming vectors $v(\Psi)$, wherein $\Psi = \{\Psi_{1,0}, \ldots \Psi_{1,Q_1-1}, \ldots, \Psi_{S,0}, \ldots, \Psi_{S,Q_S-1}\}$ is a set of all the corresponding weights of the sub-beamforming vectors $v_1(\Psi_{1,0}, \ldots, \Psi_{1,Q_1-1}), \ldots, v_S(\Psi_{S,0}, \ldots, \Psi_{S,Q_S-1})$.

Regarding the choice on the beam-synthesizing framework, for example, the beam-synthesizing framework of BSPE may use 64 antenna devices to synthesize a beam pattern with a coverage of $\Delta=2/8$ by using 8 DFT-based virtual beamforming vectors. Similarly, the beam-synthesizing framework of BSPE-JOINT may also be adopted to use two antenna sub-arrays, each of which has 32 antenna devices and synthesizes a sub-beam by using two DFT-based virtual beamforming vectors, to construct a beam pattern having the same coverage of $\Delta=2/8$.

The beam pattern constructed according to the beam-synthesizing framework of BSPE or the beam pattern constructed according to the beam-synthesizing framework of BSPE-JOINT entirely relies on the corresponding weights (phase rotations) of $\Psi=\{\Psi_0, \ldots, \Psi_{Q-1}\}$ (beam-synthesizing framework of BSPE) or $\Psi=\{\Psi_{1,0}, \ldots, \Psi_{1,Q_1-1}, \ldots, \Psi_{S,0}, \ldots, \Psi_{S,Q_S-1}\}$ (beam-synthesizing framework of BSPE-JOINT). By choosing different sets of phase rotations, different beam patterns can be generated. In order to evaluate the properties of different beam patterns, two metrics, i.e., beam to leakage power ratio (BLR) and gain variance, may be considered to assist in choosing the target beam pattern. It should be noted that, in the invention, using beam to leakage power ratio and gain variance to evaluate the properties of beam patterns merely serves as an exemplary embodiment. In other embodiments, other beam-related metrics may also be adopted to assist in choosing the target beam pattern.

In order to effectively carry out signal power transmission and reduce interferences, a high beam to leakage power ratio is normally required. In addition, a beam pattern with a high beam to leakage power ratio may potentially reduce a received signal delay spread that is observed, thereby reducing the design complexity of an equalizer at the receiving end. Regarding the beam to leakage power ratio, considering a beamforming vector v that is constructed, a gain $g(\theta,\Psi)$ in a specific beamforming direction $\theta$ may be represented as:

$$g(\theta,\Psi) = |a^H(\theta) v(\Psi)| \quad (8)$$

Therefore, a beam to leakage power ratio $\omega(\Psi)$ may be defined as a ratio between an average signal power $P_S(\Psi)$ in an expected coverage A in the beam pattern and an average leaked power $P_L(\Psi)$ outside the expected coverage. In other words, the beam to leakage power ratio $\omega(\Psi)$ may be represented as:

$$\omega(\Psi) = P_S(\Psi) / P_L(\Psi) \quad (9)$$

The average signal power $P_S(\Psi)$ is represented as:

$$P_S(\Psi) = \frac{1}{\Delta} \int_{\theta \in \Theta} v^H(\Psi) a(\theta) a^H(\theta) v(\Psi) d\theta \quad (10)$$

The average leaked power $P_L(\Psi)$ is represented as:

$$P_L(\Psi) = \frac{1}{2-\Delta} \int_{\theta \in \backslash \Theta} v^H(\Psi) a(\theta) a^H(\theta) v(\Psi) d\theta \quad (11)$$

In addition, $\Theta$ represents the expected coverage, and $\backslash \Theta$ represents the range outside the expected coverage.

Another metric is the variance of gains in the expected coverage. It is generally favored that the gains of the beam pattern within the expected coverage $\Theta$ are kept to be substantially the same. To avoid excessive gain fluctuation, gain variance $\zeta(\Psi)$ is defined as:

$$\zeta(\Psi) = \frac{1}{\Delta} \int_{\theta \in \Theta} [|v^H(\Psi) a(\theta)| - \mu(\Psi)]^2 d\theta, \quad (12)$$

wherein $\mu(\Psi)$ is the average gain within the expected coverage $\Theta_t$, which may be represented as:

$$\mu(\Psi) = \frac{1}{\Delta} \int_{\theta \in \Theta} |v^H(\Psi) a(\theta)| d\theta \quad (13)$$

In a single antenna sub-array/array, by using the beam to leakage power ratio $\omega(\Psi)$ and the gain variance $\zeta(\Psi)$ as metrics, the beam patterns constructed by using different rotation phase sets $\Psi$ can be evaluated. Accordingly, the target beam pattern that meets design needs can be chosen among the beam patterns constructed by the different rotation phase sets $\Psi$. Based on different design needs, different evaluation methods, such as only based on the beam to leakage power ratio $\omega(\Psi)$, only based on the gain variance $\zeta(\Psi)$, and based on the beam to leakage power ratio $\omega(\Psi)$ and the gain variance $\zeta(\Psi)$, may be adopted in the invention.

For example, a beam pattern having a greater beam to leakage power ratio and/or a smaller gain variance may be flexibly designed according to the proposed beam-synthesizing framework of BSPE or BSPE-JOINT proposed herein. Meanwhile, based on the design needs, it is also possible to choose a beam pattern having a moderate beam to leakage power ratio but a very small gain variance, or a beam pattern having a very large beam to leakage power ratio without taking into account the gain variance thereof. In other words, the invention is not particularly limited in this regard.

Figure 3:
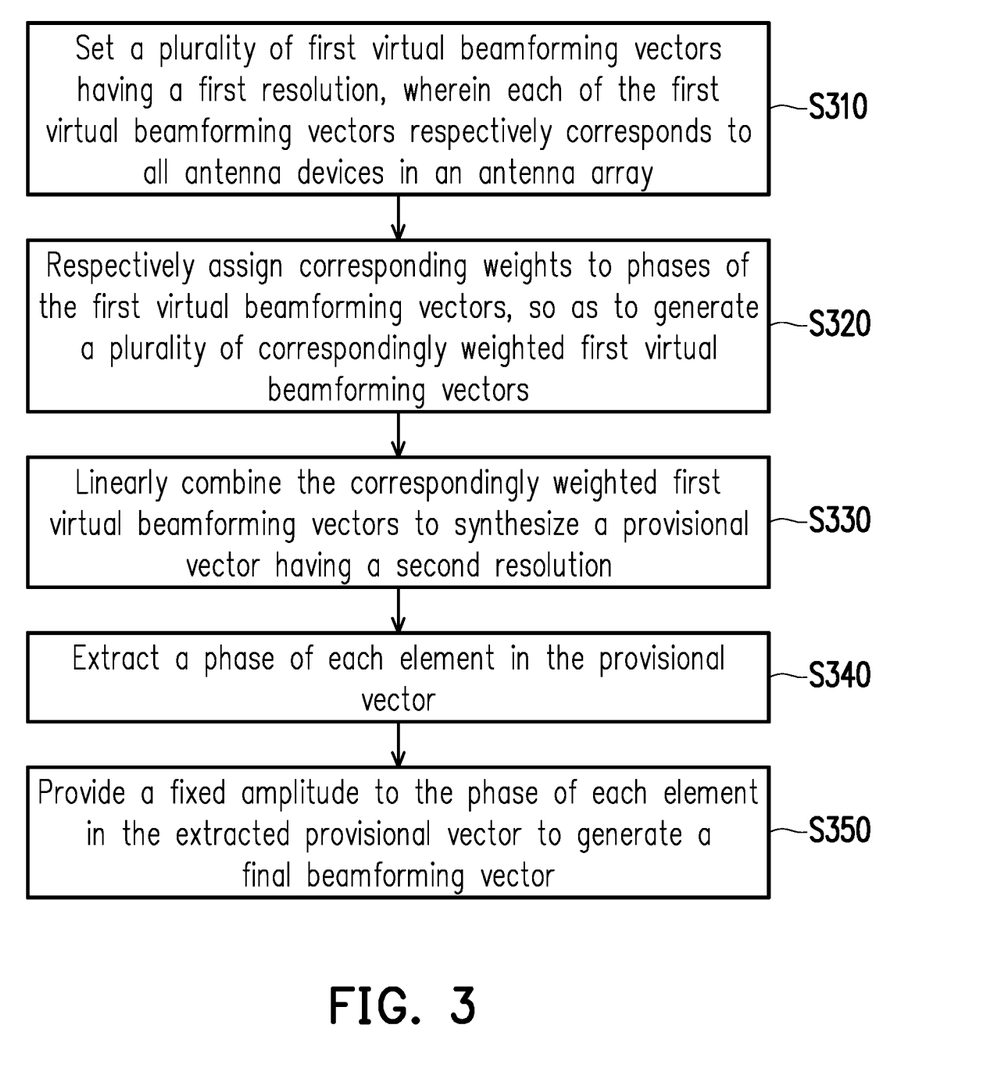
FIG. 3 is a flowchart illustrating a beam pattern design method of BSPE according to an embodiment of the invention.

FIG. 3 is a flowchart illustrating a beam pattern design method of BSPE according to an embodiment of the invention. The BSPE beam pattern design method is suitable for an antenna array system. An antenna array of the antenna array system includes a plurality of antenna devices. At Step S310, a plurality of first virtual beamforming vectors having a first resolution are set. Each of the first virtual beamforming vectors respectively corresponds to all the antenna devices in the antenna array. Then, at Step S320, corresponding weights are respectively assigned to phases of the first virtual beamforming vectors, so as to generate a plurality of correspondingly weighted first virtual beamforming vectors. At Step S330, the correspondingly weighted first virtual beamforming vectors are linearly combined to synthesize a provisional vector having a second resolution. Then, at Step S340, a phase of each element in the provisional vector is extracted. At Step S350, a fixed amplitude is provided to the phase of each element in the extracted provisional vector to generate a final virtual beamforming vector.

Figure 4:
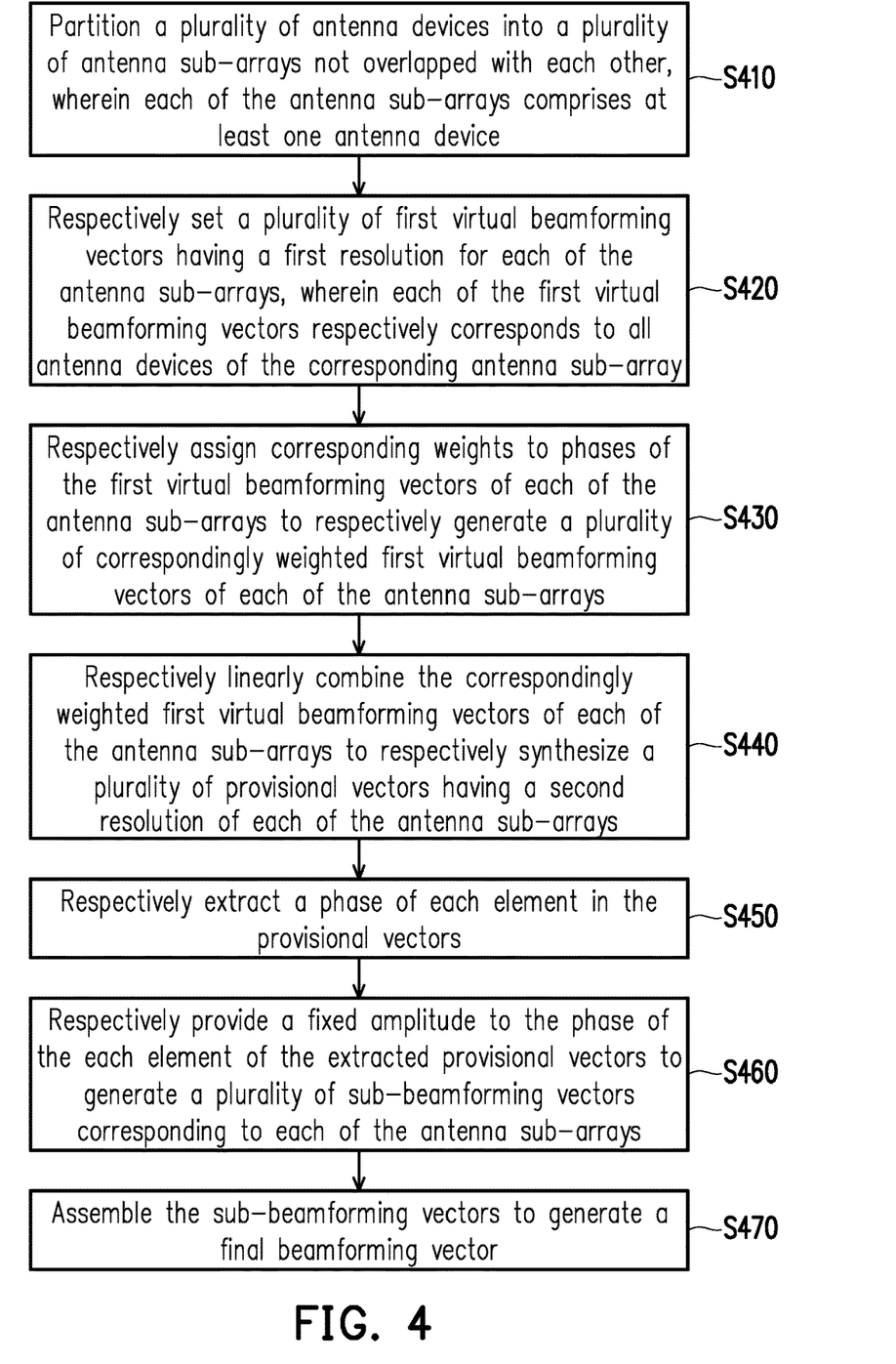
FIG. 4 is a flowchart illustrating a beam pattern design method of BSPE-JOINT according to another embodiment of the invention.

FIG. 4 is a flowchart illustrating a beam pattern design method of BSPE-JOINT according to an embodiment of the invention. The BSPE-JOINT beam pattern design method is suitable for an antenna array system. An antenna array of the antenna array system includes a plurality of antenna devices. At Step S410, the antenna devices are partitioned into a plurality of antenna sub-arrays not overlapped with each other. Each of the antenna sub-arrays includes at least one antenna device. At Step S420, a plurality of first virtual beamforming vectors having a first resolution are respectively set for each of the antenna sub-arrays. Each of the first virtual beamforming vectors respectively corresponds to all the antenna devices in the corresponding antenna sub-array. Then, at Step S430, phases of the first virtual beamforming vectors of each of the antenna sub-arrays are respectively assigned corresponding weights, so as to respectively generate a plurality of correspondingly weighted first virtual beamforming vectors of each of the antenna sub-arrays. At Step S440, the correspondingly weighted first virtual beamforming vectors of each of the antenna sub-arrays are respectively linearly combined to respectively synthesize a plurality of provisional vectors having a second resolution. Then, at Step S450, a phase of each element in the provisional vectors is extracted. At Step S460, a corresponding fixed amplitude is provided to the phase of each element in the extracted provisional vectors to respectively generate a plurality of sub-beamforming vectors corresponding to each of the antenna sub-arrays. At Step S470, the sub-beamforming vectors are assembled to generate a final beamforming vector.

Based on the above, in the embodiments of the invention, beam patterns of different resolutions are designed by using all the antenna devices. By suitably weighting the virtual high-resolution beamforming vectors and linearly combining the weighted virtual high-resolution beamforming vectors, a beam pattern of a lower resolution is synthesized, so as to design multi-resolution beam patterns with a favorable property. In addition, with the beam pattern design method, a beam pattern flexibly balancing between beam to leakage power ratio and gain variance can be designed. Therefore, a design optimized under the constraints and/or the design needs can be rendered.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A beam pattern design method, adapted to an antenna array system, wherein an antenna array in the antenna array system comprises a plurality of antenna devices, and the beam pattern design method comprises:
    setting a plurality of first virtual beamforming vectors having a first resolution, wherein each of the first virtual beamforming vectors respectively corresponds to all the antenna devices in the antenna array;
    respectively assigning corresponding weights to phases of the first virtual beamforming vectors, so as to generate a plurality of correspondingly weighted first virtual beamforming vectors;
    linearly combining the correspondingly weighted first virtual beamforming vectors to synthesize a provisional vector having a second resolution;
    extracting a phase of each element in the provisional vector; and
    providing a fixed amplitude to the phase of each element in the extracted provisional vector to generate a final beamforming vector.

2. The beam pattern design method as claimed in claim 1, further comprising:
    assigning a plurality of different sets of weights to the first virtual beamforming vectors to respectively generate a plurality of final beamforming vectors having different beam patterns;
    respectively calculating beam to leakage power ratios of the final beamforming vectors having different beam patterns;
    respectively calculating gain variances of the final beamforming vectors having different beam patterns; and
    choosing, as a target beamforming vector, a final beamforming vector having a target pattern from the final beamforming vectors having different beam patterns according to at least one of the beam to leakage power ratios and the gain variances of the final beamforming vectors having different beam patterns.

3. The beam pattern design method as claimed in claim 1, wherein setting the first virtual beamforming vectors having the first resolution comprises:
setting the first virtual beamforming vectors having the first resolution by using discrete Fourier transform (DFT) basis vectors.

4. The beam pattern design method as claimed in claim 1, wherein the first resolution is higher than the second resolution.

5. The beam pattern design method as claimed in claim 1, wherein the first virtual beamforming vectors are a plurality of virtual beamforming vectors having a highest resolution in the antenna array system.

6. The beam pattern design method as claimed in claim 1, wherein the corresponding weights are corresponding phase rotations respectively applied to the first virtual beamforming vectors.

7. The beam pattern design method as claimed in claim 1, wherein the fixed amplitude is generated by normalizing the provisional vector.

8. A beam pattern design method, adapted to an antenna array system, wherein an antenna array in the antenna array system comprises a plurality of antenna devices, and the beam pattern design method comprises:
partitioning a plurality of antenna devices into a plurality of antenna sub-arrays not overlapped with each other, wherein each of the antenna sub-arrays comprises at least one antenna device;
respectively setting a plurality of first virtual beamforming vectors having a first resolution for each of the antenna sub-arrays, wherein each of the first virtual beamforming vectors respectively corresponds to all antenna devices in the corresponding antenna sub-array;
respectively assigning corresponding weights to phases of the first virtual beamforming vectors of each of the antenna sub-arrays, so as to respectively generate a plurality of correspondingly weighted first virtual beamforming vectors of each of the antenna sub-arrays;
respectively linearly combining the correspondingly weighted first virtual beamforming vectors of each of the antenna sub-arrays to respectively synthesize a plurality of provisional vectors having a second resolution of each of the antenna sub-arrays;
respectively extracting a phase of each element in the provisional vectors;
respectively providing a corresponding fixed amplitude to the phase of each element in the phase-extracted provisional vectors to respectively generate a plurality of sub-beamforming vectors corresponding to each of the antenna sub-arrays;
assembling the sub-beamforming vectors to generate a final beamforming vector.

9. The beam pattern design method as claimed in claim 8, further comprising:
assigning a plurality of different sets of weights to the first virtual beamforming vectors to respectively generate a plurality of final beamforming vectors having different beam patterns;
respectively calculating beam to leakage power ratios of the final beamforming vectors having different beam patterns;
respectively calculating gain variances of the final beamforming vectors having different beam patterns; and
choosing, as a target beamforming vector, a final beamforming vector having a target pattern from the final beamforming vectors having different beam patterns according to at least one of the beam to leakage power ratios and the gain variances of the final beamforming vectors having different beam patterns.

10. The beam pattern design method as claimed in claim 8, wherein setting the first virtual beamforming vectors having the first resolution comprises:
setting the first virtual beamforming vectors having the first resolution by using discrete Fourier transform (DFT) basis vectors.

11. The beam pattern design method as claimed in claim 8, wherein the first resolution is higher than the second resolution.

12. The beam pattern design method as claimed in claim 8, wherein the corresponding weights are corresponding phase rotations respectively applied to the first virtual beamforming vectors.

13. The beam pattern design method as claimed in claim 8, wherein the fixed amplitude is generated by normalizing the provisional vectors.

* * * * *